United States Patent

Mark et al.

[11] Patent Number: 5,932,056
[45] Date of Patent: Aug. 3, 1999

[54] METHOD FOR MAKING STRETCH LEATHER LAMINATES AND FINISHED ARTICLES CONTAINING SUCH LAMINATES

[75] Inventors: Moishe Mark, Wilmington, Del.; Edward Lee Meiser, Bland, Mo.

[73] Assignee: E. I. du Pont de Nemours and Company, Wilmington, Del.

[21] Appl. No.: 08/947,788

[22] Filed: Oct. 9, 1997

Related U.S. Application Data

[63] Continuation-in-part of application No. 08/730,423, Oct. 15, 1996, abandoned.

[51] Int. Cl.[6] .............. B32B 31/04; B32B 5/04; B32B 9/02; C14B 7/02
[52] U.S. Cl. .............. 156/266; 156/257; 36/46.5; 36/47
[58] Field of Search .............. 156/227, 256, 156/267, 226; 428/473; 36/102, 44, 55, 46.5, 47, 48, 49

[56] References Cited

U.S. PATENT DOCUMENTS

| | | | |
|---|---|---|---|
| 1,183,037 | 5/1916 | Scheuer | 428/473 X |
| 1,302,473 | 4/1919 | Scheuer | 442/183 |
| 2,001,962 | 5/1935 | Kantrow | 428/473 X |
| 2,136,092 | 11/1938 | Troy . | |
| 2,269,923 | 1/1942 | Vamos | 428/473 X |
| 2,316,351 | 4/1943 | Miller | 428/473 X |
| 2,549,985 | 4/1951 | Normington . | |
| 3,398,042 | 8/1968 | Odenthal | 428/473 X |
| 3,755,024 | 8/1973 | Grapin | 428/473 X |
| 3,860,469 | 1/1975 | Gregorian et al. . | |
| 4,925,732 | 5/1990 | Driskill et al. | 428/336 |

FOREIGN PATENT DOCUMENTS

| | | | |
|---|---|---|---|
| 2178323 | 11/1973 | France | 428/473 |
| 2 681 876 | 4/1993 | France . | |
| 1 329 786 | 9/1973 | United Kingdom . | |
| WO 93/03918 | 3/1993 | WIPO . | |
| 95/02072 | 1/1995 | WIPO . | |
| PCT/US97/18282 | 10/1996 | WIPO . | |
| WO 97/34762 | 9/1997 | WIPO . | |

*Primary Examiner*—Curtis Mayes
*Attorney, Agent, or Firm*—George A. Frank

[57] ABSTRACT

A method for making a stretch leather laminate of stretch fabric and stretchable leather so that the high-stretch directions of the fabric and the leather are substantially aligned in a preselected region of the leather. Finished articles containing such laminates are also provided.

6 Claims, 1 Drawing Sheet

METHOD FOR MAKING STRETCH LEATHER LAMINATES AND FINISHED ARTICLES CONTAINING SUCH LAMINATES

CROSS-REFERENCE TO RELATED APPLICATIONS

This application is a continuation-in-part of Ser. No. 08/730,423, filed Oct. 15, 1996 now abandoned.

FIELD OF THE INVENTION

This invention relates to a method for preparing laminates of stretch fabric and stretchable leather. This invention further relates to finished articles containing a laminate produced by said method.

BACKGROUND OF THE INVENTION

Leather backed with fabric is known. U.S. Pat. No. 2,136,092 (Troy) discloses a method for laminating an elastic fabric in the stretched or extended state to thin, soft leather.

U.S. Pat. No. 2,269,923 (Vamos) discloses a stretchable laminate of thin, soft, stretchable leather and elastic fabric incorporating an elastomeric fiber. The laminate has a low elastic modulus to allow it to stretch with foot movement when it is used in a shoe. The laminate can be stretched in the range of 10% to 50% or more. The preferred elastic fabric has more stretch than the leather, is a "one-way" stretch fabric, and is applied to the skin so that its direction of stretch corresponds to the maximum stretch of the skin. Laminates so prepared as shoe uppers ("vamps") need to be trimmed in a separate operation to remove the outer circumference of the fabric.

It is also known that hides are nonuniform and have "lines of tightness" which generally run at right angles to the high-stretch directions in the hide. The lines of tightness are curved so that they are approximately parallel to the backbone in the center of the hide, where there is substantially no stretch at the backbone, and approximately perpendicular to the backbone near the neck and tail. The stretch can also veer off these arc-like lines in certain areas of the hide. This is described in the "Manual of Shoemaking", (C. &. J. Clark, Ltd., Somerset, England), 6th printing, 1989, pp. 94–101.

It is customary when laminating stretch fabric to a hide to lay a large piece of fabric over substantially the entire area of the skin. With such a method, some parts of the hide will have their maximum stretch aligned with the maximum stretch of the fabric, and some will be misaligned resulting in inadequate properties in the laminates, especially in the unload power and percent set of the laminate. The result is considerable waste of laminate or finished products having low durability and poor comfort or both.

The instant invention solves these problems by providing a method for cutting shaped parts of specifically engineered stretchable fabric and stretchable leather followed by laminating those portions of fabric and leather that have been cut to final shape so that all the fabric stretch is substantially aligned with the direction of maximum stretch of the leather resulting in a laminate of high comfort and quality.

SUMMARY OF THE INVENTION

The method of the present invention for making a laminate of stretch fabric and stretchable leather useful for manufacturing shoes comprises the steps of:

(a) pre-cutting leather substantially to size and shape of a component of the shoe to be manufactured so that the cut piece of leather has a substantially uniform direction of maximum stretchability and a substantially uniform direction of minimum stretchability wherein said maximum and minimum directions of stretchability are substantially perpendicular to each other and wherein said direction of maximum stretchability runs across the ball of the shoe to be manufactured and said direction of minimum stretchability runs from toe to heel;

(b) pre-cutting one-way stretch fabric substantially to the size and shape of a component of a shoe to be manufactured so that the cut piece of fabric has a substantially uniform direction of maximum stretchability and a substantially uniform direction of minimum stretchability wherein said maximum and minimum directions of stretchability are substantially perpendicular to each other and wherein said direction of maximum stretchability runs across the ball of the shoe to be manufactured and said direction of minimum stretchability runs from toe to heel, such that said fabric is undercut in relation to said piece of leather;

(c) orienting said piece of fabric to said piece of leather such that the stretch direction of the fabric and the direction of maximum stretchability of the leather are substantially aligned over the total area of the piece of leather; and (d) laminating the fabric to the leather.

The present invention further provides finished articles containing a laminate of stretch fabric and stretchable leather which is produced by the above method.

DETAILED DESCRIPTION OF THE INVENTION

Figure 1:
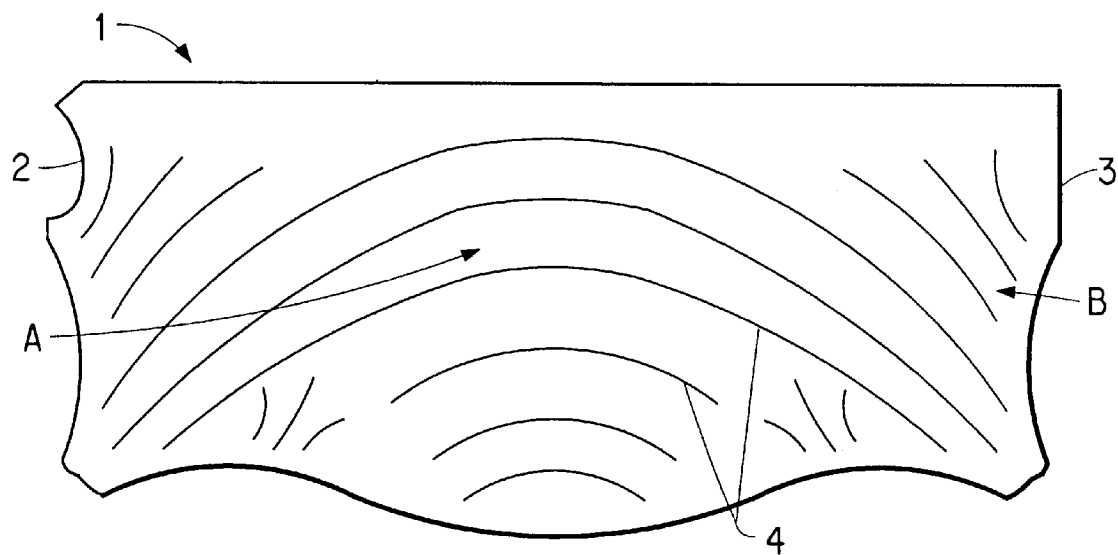
FIG. 1 is a schematic representation of half a bovine hide which has been split along the backbone. The area of the backbone 1 is at the top, that of the neck 2 at the left, and that of the butt 3 at the right. "Lines of tightness" are indicated by 4. The Regions tested in the Examples herein are indicated at "A" and "B".

In a fabric/leather stretchable laminate, it is desirable to have low set so that the finished article recovers its shape after being stretched. By set is meant the additional length remaining after a sample has been stretched and released. Set is important for thin, pliable leather, especially when it has been made stretchable (elastic) and therefore is likely to be subjected to greater forces than ordinary leather. Such leather is easily stretched and deformed, and its ability to recover substantially to its original dimensions is important to its durability and usefulness. A set of about 10% or less is preferred.

In certain applications, it is also desirable for comfort and stability that the unload power be controlled in at least a specific portion of the finished article. By unload power is meant the stress observed in a sample as the sample retracts from an extended state. For example, if the unload power of a material intended for use in shoes is too high, the foot will be uncomfortably constrained and unable to move. If the unload power is too low at a given elongation, the shoe will inadequately contain the foot, and the shoe will be unstable. For example, an unload power between about 2 and about 7 pounds per inch at 25% elongation is preferred.

In A and B quality hides, as graded by shoe industry standards, about 70 percent of the leather is generally useful, the remainder being too thin, too marred by nicks and cuts, or too small to be used. When an entire such hide is laminated to one large piece of elastic fabric, only about 30% of the originally useful part of the hide has the necessary relative alignment of the direction of maximum stretchability of the leather with the direction of fabric stretch with a combination of the desired low set and optimum unload power. With the method of the present invention, however, nearly 100% of the originally useful part of the hide has such an alignment. The yield of useful, high-quality laminate can therefore be more than tripled.

It has been found that both low set and optimum unload power can be obtained in a laminate made from any part of a hide currently used to make shoe uppers when the high-stretch direction of the fabric is substantially aligned with the direction of maximum stretchability of the leather. That is, the high-stretch direction of the fabric is laminated at approximately a right angle to the lines of tightness in the leather. This is accomplished by (a) providing a piece of cut to shape stretchable leather having at least one high stretch direction; (b) providing at least one piece of cut to shape one-way stretch fabric which has been undercut; (c) orienting the fabric to the leather such that the high stretch direction of the fabric and at least one high stretch direction of the leather are substantially aligned substantially completely when used for the manufacture of shoes and aligned in at least one preselected region of the leather when used for manufacturing other leather articles, the preselected region comprising at least 50% of the total area of the piece of leather and being preselected to produce a desired stretch characteristic in a finished article; and (d) laminating the fabric to the leather. The hide and the fabric can be cut into shaped components and the fabric laminated to the cut part of the hide one component at a time, as distinct from laminating the entire hide to a single large piece of fabric. In the method of the present invention, moreover, there is little waste, since each component has the optimum stretch characteristics for its intended use and any irregularities in the hide can be avoided prior to lamination.

The laminates of this invention can be used to make finished articles such as footwear, garments, apparel accessories, upholstered furniture and luggage. Garments include coats, jackets, pants and skirts. Apparel accessories include hats, belts and gloves including athletic gloves such as hockey gloves, baseball gloves, golf gloves and sailing gloves. Upholstered furniture includes residential, commercial and automotive seating. The laminates of this invention are particularly advantageous in shoes. When the process of this invention is used to make a component of a shoe, then leather is pre-cut to shape so that the cut piece has uniform directions of maximum and minimum stretchability substantially perpendicular to each other and the stretch direction of the fabric is substantially aligned with the direction of maximum stretchability of the leather over the total area of the leather.

As used herein, "leather" means the tanned hide of cow (including calves), goat, sheep, pig, kangaroo, and other animals, provided their hides or skins are capable of being tanned to give stretch that is sufficient for the intended use. Cow (bovine) leather is preferred for most footwear uses. The leather must be capable of being stretched at least to the extent desired in the final product for which is intended. It should be of appropriate thickness so that the laminate is the correct thickness for its intended use. "Grain side" means the side of the leather which was toward the outside of the animal, and "flesh side" means the side of the leather which was toward the inside of the animal.

As used herein, "undercut" fabric in relation to cut leather means that the piece of leather is larger than the piece of the fabric in all directions of the plane of the leather; the difference being such that during the lasting operation of the shoe manufacturing process the insole can join the shoe upper leather directly, that is, there is substantially no stretch fabric included within the area of attachment and during the reinforcement of the topline of the shoe, the fabric is not within the fold line. The topline of the shoe is reinforced by inserting a substantially non-stretchable fabric tape and a high strength, low stretch cord prior to folding. The preferred dimensions of the undercut are 6/32–14/32 in. (5–11 mm) all around the circumference (See FIG. 2).

Figure 2:
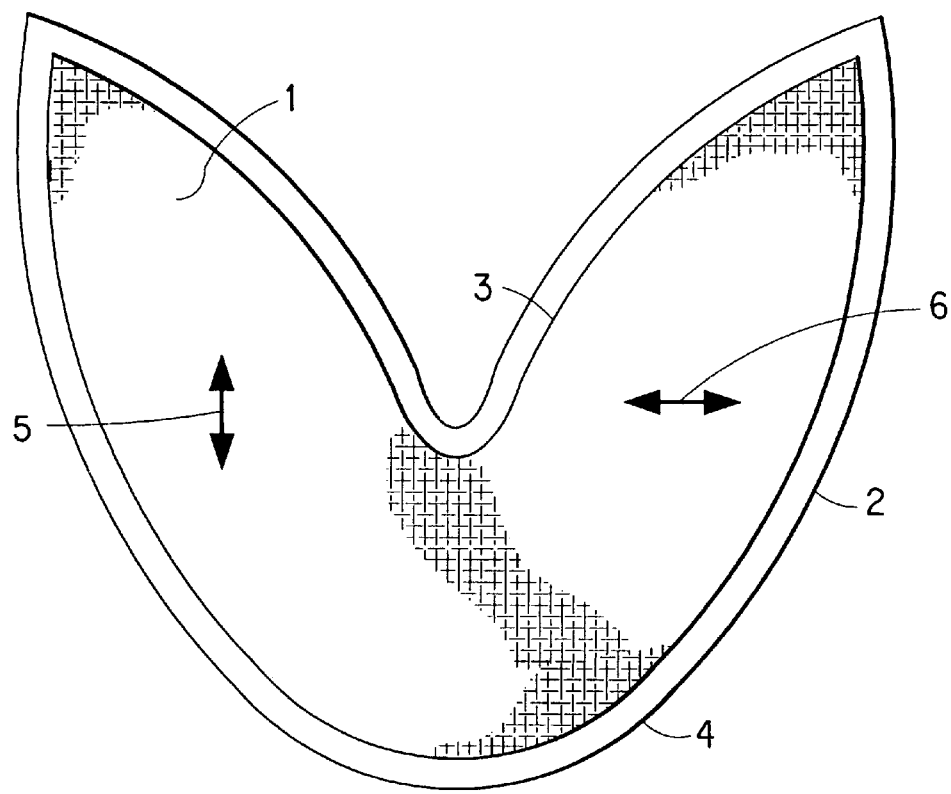
FIG. 2 illustrates a vamp for a ladies' shoe in which the undercut piece of fabric is laminated to a pre-cut piece of leather.

As shown in FIG. 2, fabric 1 is laminated to leather 2. The edge 3 of the fabric can be seen to be cut smaller than edge 4 of the leather. Arrow 5 indicates the low-stretch direction of the fabric and the leather, and arrow 6 indicates the high-stretch direction of the fabric and the leather. During shoemaking, undercutting allows for the lasting (forming on a mold) of one thickness of shoe upper laminate around the area where the sole joins the shoe upper. This has several advantages. Sharper, crisper lines are created, resulting in a better looking shoe. In addition, the lasting process is easier to perform. Finally, no delamination of the stretch fabric from the stretch leather upper occurs when the shoe sole is hot-melt cemented to the upper in a subsequent step.

When the term "undercut" is used in operations other than shoe manufacturing, then the size difference between fabric and leather is such that during seaming operation, there is substantially no stretch fabric included within the area of attachment.

The fabric can be woven, knit, or nonwoven. The fabric should be capable of being stretched at least to the degree desired in the final, finished product. Fabrics with stretch of about 15%–40% can be used. Fabrics with stretch of about 25% to 35% are preferred for shoe uppers. The fabric can have higher, lower, or the same stretchability as the leather. In order to provide sufficient unload power, the fabrics should comprise elastomeric fibers. Spandex is a preferred elastomeric fiber, Lycra® spandex (a registered trademark of E. I. du Pont de Nemours and Company) being most preferred.

Preferably, the fabric is a one-way stretch fabric, with only little stretch in the direction perpendicular to its one-way stretch, in order to be able to obtain proper alignment of the stretch in the fabric and in the leather. This can be readily achieved in wovens by weaving an elastomeric fiber only into the warp or the weft. In knits, techniques such as weft insertion can be used to obtain fabrics with substantially one-dimensional stretch. Similarly, nonwovens can be made with stretch predominantly in one direction, for example by stitch-bonding or otherwise incorporating spandex in one direction into the nonwoven.

The fabric generally needs to be thin enough so that the laminate does not significantly exceed the customary thickness of ordinary leather commonly used in the final product. For example, in ladies' dress shoes the laminate should be about 1.2 mm thick, for athletic shoes about 1.0–1.5 mm, and for boots, about 1.7–2.5 mm. It is advantageous for the fabric to be porous so that the laminate "breathes", smooth to minimize unevenness on the grain side of the leather, strong to provide durability to the laminate, and to have optimum bending modulus so the laminate has the proper balance of suppleness and rigidity for its intended use.

The stretch characteristics of the fabric/leather laminate are important in the finished article. Substantially aligning the high stretch directions of the leather and fabric maximizes flexibility of the laminate and the durability of the shoe made from such a laminate. This consideration can be used to produce the desired stretch characteristics in the finished article. For example, leather for shoes is ordinarily cut "tight heel to toe" so that the lines of tightness run from the heel toward the toe. This provides the shoe with longitudinal stability while allowing lateral flex and stretch for durability and comfort. The laminates contemplated by the instant invention are cut tight heel to toe. This means that the maximum stretchability direction of the fabric/leather laminate is across the ball of the shoe and the direction of minimum stretchability is in the long direction of the shoe. Therefore, the one-way stretch feature of the fabric is important for shoes, in which stability and durability depend on having the high-stretch and low-stretch directions of the leather and the laminate properly oriented.

For shoes, the laminates have certain preferred characteristics which can lead to shoes of optimum comfort and newness retention. These characteristics can be measured by determining the unload power at given elongations. The preferred laminates fall within the ranges indicated in the chart below:

| Elongation (%) | Unload Power Range (lb/in) |
| --- | --- |
| 0 | 0 |
| 5 | 0–0.85 |
| 10 | 0.2–1.5 |
| 15 | 0.29–2.2 |
| 20 | 1.2–3.2 |
| 25 | 1.9–6.0 |
| 30 | 4.2–12.0 |

For purposes of this invention, "elastomeric fiber" means a staple fiber or continuous filament which has a break elongation in excess of 100% and which when stretched and released, retracts quickly and forcibly to substantially its original length. Such fibers include rubber fiber, spandex and polyetherester fiber, and can be covered or entangled with other non-elastomeric fibers or can be bare (uncovered). "Spandex" has its customary meaning, that is, manufactured filaments or fiber in which the fiber-forming substance is a long-chain synthetic elastomer comprised of at least 85% by weight of a segmented polyurethane.

"Substantially aligned" means that the high-stretch direction of the fabric and the high-stretch direction of the leather are aligned to within about 45° of parallel, preferably within about 22° of parallel. The exact degree of alignment which is required to obtain the desired combination of low set and optimum unload power can vary somewhat due to the variable nature of natural leather. Therefore, the properties of any individual piece of leather can be such that the required alignment must be slightly better or can be worse than about 20°.

The fabric in the laminate is not generally meant to be seen and, therefore, it is generally applied to the side of the leather intended for the inside of the final product. For dress shoes, this is the flesh side of the leather. For stretch rawhide or suede, this is the unfinished side of the leather. If desired, a second piece of natural leather, lining fabric, or artificial leather having suitable stretch characteristics can be laminated to the first laminate on the fabric side to provide a stretch laminate with two finished sides.

Other customary treatments for leather such as dyeing or applying water repellent or scuff-resistant finishes, and the like, can be performed if such treatments do not substantially affect the stretch, unload power, and set characteristics of the laminate.

The cut to shape fabric can be applied or laid onto the leather in either a relaxed state or while stretched. If a smooth surface is desired in the laminate, the fabric should not be excessively stretched during laminating, and the adhesive should be uniformly applied, so that the finished laminate is free of gathers and puckers, unless such features are desired.

Any type of adhesive can be used. The preferred adhesives are sufficiently elastic such that they do not inhibit the stretch of the laminate and are preferably of sufficiently high viscosity during lamination that they do not form a continuous film, which would affect the porosity of the laminate. For example, hot melt and pressure-sensitive adhesives are preferred; solvent-based and latex adhesives can also be used. The adhesive can be applied to the fabric or the leather or both in a discontinuous manner so that the porosity and breathability of the laminate are not adversely affected, especially when the final product is a shoe. The laminate can be formed by pressing the fabric onto the leather by means such as a flat press, a roller press or a vamp press, at a pressure that will not substantially affect the surface aesthetics of the leather but will create a bond between the cut-to-final shape parts of leather and fabric.

EXAMPLES

TEST PROCEDURES

Three samples were tested for alignment of fabric stretch and leather stretch. Each sample was 3 inches long and 1 inch wide and was tested in the length direction. An Instron Tensile Tester was used with a C cell battery and C clamps with 1 inch by 3 inch faces. The sample gauge length (between the clamps) was 2 inches. Each sample was stretched between 0 and 30% extension three times at a constant 200% per minute rate of extension. On the third cycle, while unloading from the last extension, the stress, or unload power, was recorded in pounds per inch at 30% elongation. Percent set was recorded as the percentage of the gain in the length of the material remaining immediately after the third extension, that is, when the stress returned to zero:

$$\% \text{ Set} = \frac{\text{Relaxed length} - \text{Initial length}}{\text{Initial length}} \times 100$$

SAMPLE PREPARATION

The leather was one-half of a tanned bovine hide sold as "Leather for Lycra®" by Curtidos Trevino, Nuevo Leon, Mexico) with about 30% maximum stretch and a finished thickness of about 0.8 mm. An area about 12 inches down from the backbone in the center of the tanned hide was designated Region A, and an area about 12 inches down from the backbone near the butt was designated Region B. (See FIG. 1) The lines of tightness in Region A are approximately parallel to the backbone, i.e., the direction of maximum stretchability is perpendicular to the backbone, and the lines of tightness in Region B are approximately perpendicular to the backbone, i.e., the direction of maximum stretchability is close to parallel to the backbone. The leather had an unload power of about 7 pounds per inch in the high-stretch direction and about 11 pounds per inch in the low-stretch direction, and 17% set in both the high- and low-stretch directions.

The fabric was a plain weave with a 560 denier Lycra® Type 127 spandex (registered trademark of E. I. du Pont de Nemours and Company) air-jet entangled with 150 denier 34 filament Dacron® Type 56 polyester (a registered trademark of E. I. du Pont de Nemours and Company) in the fill and 100 denier 2-ply 34 filament Dacron® Type 56 textured polyester in the warp. In the fill direction, the fabric had an unload power of 3 pounds per inch and 5% set in the high-stretch (fill) direction; in the low-stretch (warp) direction it had over 50 pounds per inch unload power and 15% set. It was about 0.4 mm thick.

Hot melt adhesive ("System #2100", an ethylene/vinyl acetate copolymer blended with tackifying resins; m.p. 220° F.; sold by Starensier Corp., Newburyport, Mass.) was applied to this fabric. The adhesive was roll-coated onto the fabric in a discontinuous random pattern by conventional means.

Example 1

Four squares of the fabric with adhesive were laid without stretching on the flesh side of the tanned hide, and the resulting laminate was held under pressure of approximately 90 lb/in for approximately 3 seconds until the fabric reached a temperature of 220° F.

The arrangement of the four fabric squares was as follows:

Sample 1 was placed in Region A of the hide (see FIG. 1) in such a way that the direction of maximum stretchability of the leather and that of the fabric were parallel. When stretch tested in the direction of high stretchability, the results are shown below as A1. When stretched perpendicular to high stretchability, the results are shown as A2.

For sample 2, the fabric was turned 90° (still in Region A); when stretch tested parallel to the stretch direction of the fabric (perpendicular to the high stretch direction of the leather), results are shown as A3; when testing perpendicular to the fabric stretch, results are A4.

Samples 3 and 4 were arranged as above but in Region B of the hide; this means that because the maximum stretchability direction of the hide has "turned" from Region A to Region B, the fabric placed parallel to that in sample 1 now had its direction of stretch substantially perpendicular to the direction of high stretchability of the leather. Testing as above, results B1 and B2 reflect stretch testing parallel and perpendicular, respectively, to the fabric stretch direction and B3 and B4 are also parallel and perpendicular, respectively, to the fabric stretch direction.

As can be seen from Table 1 below, only A1 and B3, where the test direction (applied stress direction) and the high stretch direction of the leather and fabric are substantially aligned, fall within the acceptable range of test results (low unload power and ≤10% set) and these samples represent the claimed invention. These results also demonstrate that the method of this invention permits a much more economical and practical use of a hide. Results B1 and B2, both unacceptable, simulate that situation where a stretch fabric is laid down on a hide. Such an arrangement does not compensate for the natural change of maximum stretch direction in the hide.

TABLE 1

| Sample/Test | Sample Alignment (Direction-Fabric Stretch v. Leather Stretch, degrees) | Testing Direction- Stretch v. Fabric Stretch, degrees) | Laminate Properties Unload Power (lb/in) | Set (%) |
|---|---|---|---|---|
| A1 | 0 | 0 | 5 | 4 |
| A2 | 0 | 90 | >50 | 15 |
| A3 | 90 | 90 | 18 | 14 |
| A4 | 90 | 0 | >50 | 15 |
| B1 | 90 | 0 | 6 | 11 |
| B2 | 90 | 90 | >50 | 16 |
| B3 | 0 | 0 | 5 | 4 |
| B4 | 0 | 90 | >50 | 14 |

Example 2

This Example further demonstrates that the characteristics of the laminate depend on how the laminate is prepared, cut and used.

Fabric was laminated to the hide in Region A so that the high-stretch direction of the fabric was aligned with the high-stretch direction of the hide, that is, perpendicular (90°) to the backbone of the hide. Samples were then cut at various angles to the backbone for testing. When the final cut shape was aligned so that the high applied stress direction (test direction) was aligned within about 20° of the alignment of the high-stretch directions of the fabric and leather, as in sample A1, the desired combination of low unload power and low % set was obtained. Above about 20° alignment, the properties became less desirable. (A1 and A2 were tests as in Example 1). These data are shown in Table 2:

TABLE 2

| Sample/Test | Sample Alignment (Direction-Fabric Stretch v. Leather Stretch, degrees) | Testing Direction- Stretch v. Fabric Stretch, degrees) | Laminate Properties Unload Power (lb/in) | Set (%) |
|---|---|---|---|---|
| A1 | 0 | 0 | 5 | 4 |
| A5 | 0 | 22 | 7 | 12 |
| A6 | 0 | 45 | 7 | 13 |
| A2 | 0 | 90 | >50 | 15 |

The above results also indicate that if one were to use as a part of a shoe, components aligned as in A5 and A6, one can obtain unload power similar to the component of this invention, A1, i.e., they can result in a comfortable shoe. However, these same alignments A5 and A6 have substantially higher % set, outside of this invention, and, therefore, result in shoes which will deform during wear.

We claim:

1. A method for making a laminate of stretch fabric and stretchable leather comprising the steps of:

(a) providing a piece of stretchable leather having at least one high stretch direction wherein the leather is pre-cut substantially to the size and shape of a component of a finished article;

(b) providing one-way stretch fabric wherein the fabric is pre-cut substantially to the size and shape of a component of the finished article;

(c) orienting the fabric to the leather such that the high stretch direction of the fabric and the high stretch direction of the leather are substantially aligned in at least one preselected region of the leather, the preselected region comprising at least 50% of the total area of the piece of leather and being preselected to produce a desired stretch characteristic in a finished article; and (d) laminating the fabric to the leather such that the fabric is undercut.

2. The method of claim 1 wherein the preselected region of the leather comprises at least 90% of the total area of the piece of leather.

3. A method for making a laminate of stretch fabric and stretchable leather useful for manufacturing shoes comprising the steps of:

(a) pre-cutting leather substantially to size and shape of a component of the shoe to be manufactured so that the cut piece of leather has a substantially uniform direction of maximum stretchability and a substantially uniform direction of minimum stretchability wherein said maximum and minimum directions of stretchability are substantially perpendicular to each other and wherein said direction of maximum stretchability runs across the ball of the shoe to be manufactured and said direction of minimum stretchability runs from toe to heel;

(b) pre-cutting one-way stretch fabric substantially to the size and shape of a component of a shoe to be manufactured so that the cut piece of fabric has a substantially uniform direction of maximum stretchability and a substantially uniform direction of minimum stretchability wherein said maximum and minimum directions of stretchability are substantially perpendicular to each other and wherein said direction of maximum stretchability runs across the ball of the shoe to be manufactured and said direction of minimum stretchability runs from toe to heel, such that said fabric is undercut in relation to said piece of leather;

(c) orienting said piece of fabric to said piece of leather such that the stretch direction of the fabric and the direction of maximum stretchability of the leather are substantially aligned over the total area of the piece of leather; and (d) laminating the fabric to the leather.

4. The method of claim 3 wherein the stretch fabric has a stretch of 15–40%.

5. The method of claim 3 wherein the stretch fabric comprises spandex as an elastomeric fiber.

6. A method for manufacturing shoes comprising the steps of:

(a) making a laminate of stretch fabric and stretchable leather comprising the steps of:

(i) pre-cutting leather substantially to size and shape of a component of the shoe to be manufactured so that the cut piece of leather has a substantially uniform direction of maximum stretchability and a substantially uniform direction of minimum stretchability wherein said maximum and minimum directions of stretchability are substantially perpendicular to each other and wherein said direction of maximum stretchability runs across the ball of the shoe to be manufactured and said direction of minimum stretchability runs from toe to heel;

(ii) pre-cutting one-way stretch fabric substantially to the size and shape of a component of a shoe to be manufactured so that the cut piece of fabric has a substantially uniform direction of maximum stretchability and a substantially uniform direction of minimum stretchability wherein said maximum and minimum directions of stretchability are substantially perpendicular to each other and wherein said direction of maximum stretchability runs across the ball of the shoe to be manufactured and said direction of minimum stretchability runs from toe to heel, such that said fabric is undercut in relation to said piece of leather;

(iii) orienting said piece of fabric to said piece of leather such that the stretch direction of the fabric and the direction of maximum stretchability of the leather are substantially aligned over the total area of the piece of leather; and (iv) laminating the fabric to the leather;

(b) carrying out a lasting operation during which a shoe insole is Joined to a shoe upper leather laminate prepared in step (a) above; and as part of the lasting operation, reinforcing a topline of a shoe by inserting a substantially non-stretchable fabric tape and a high strength, low stretch cord prior to folding.

* * * * *